United States Patent [19]
Stalport et al.

[11] Patent Number: 5,385,122
[45] Date of Patent: Jan. 31, 1995

[54] DEVICE FOR ADJUSTING A SUPPLY WATER FLOWRATE IN A STEAM GENERATOR TUBE

[75] Inventors: Gérard Stalport; Benoît Giraud; Valérie Andujar, all of Lyons, France

[73] Assignee: Framatome, Courbevoie, France

[21] Appl. No.: 92,419

[22] Filed: Jul. 16, 1993

[30] Foreign Application Priority Data
Jul. 22, 1992 [FR] France ................. 92 09055

[51] Int. Cl.⁶ ............................................. F22B 37/06
[52] U.S. Cl. ............................. 122/511; 122/512; 122/DIG. 14; 165/174
[58] Field of Search ............... 122/32, 33, 511, 512, 122/DIG. 14; 165/174

[56] References Cited

U.S. PATENT DOCUMENTS

| | | | |
|---|---|---|---|
| 4,590,991 | 5/1986 | Cooper, Jr. et al. | 122/32 X |
| 4,721,067 | 1/1988 | Chaix et al. | 122/32 |

FOREIGN PATENT DOCUMENTS

| | | |
|---|---|---|
| 0232527 | 8/1987 | European Pat. Off. . |
| 2029984 | 3/1980 | United Kingdom . |
| 2082308 | 3/1982 | United Kingdom . |

Primary Examiner—Edward G. Favors
Attorney, Agent, or Firm—Pollock, Vande Sande & Priddy

[57] ABSTRACT

A removable flow rate-restricting device (25) is placed and fixed in a through-opening (18) of the tube plate (15) level with which is fixed the tube (6), from inside the water box (9). The flow rate-restricting device (25) includes an orifice plate which is inserted into the opening (18) of the tube plate.

8 Claims, 3 Drawing Sheets

FIG. 2

DEVICE FOR ADJUSTING A SUPPLY WATER FLOWRATE IN A STEAM GENERATOR TUBE

FIELD OF THE INVENTION

The invention relates to a device for adjusting the circulation of supply water in a steam generator tube fixed, at one of its ends, to a tube plate.

BACKGROUND OF THE INVENTION

Steam generators are known, and in particular steam generators used in fast neutron nuclear reactors which include heat exchange tubes in which the supply water of the steam generator is heated and then vaporized after passing inside the tubes in which it flows.

The tubes of the steam generator are connected at one of their ends to a tube plate constituting one of the walls of a water box by means of which the supply water is distributed to the inside of the tubes of the bundle of the steam generator.

The tubes of the bundle are connected at their other ends to a tube plate constituting a wall of a steam manifold in which the water vapor formed in the tubes is collected.

A heat-exchange fluid, such as liquid sodium, is made to circulate in contact with the external surface of the tubes, so as to be cooled upon contact with the tubes of the steam generator and to perform the heating and vaporization of the supply water.

In particular, steam generators with straight tubes are known, such as the steam generator described in French Patent Application No. 91-14249 filed on Nov. 19, 1991, which includes straight tubes connected rigidly to the tube plates at each of their ends, the jacket of the steam generator including deformable parts made up of elements such as bellows making it possible to absorb the differential expansions between the bundle of the steam generator and the jacket.

Steam generators including rectilinear tubes are also known which are associated with expansion loops.

In fast neutron nuclear reactors, use is also made of steam generators having tubes wound into a helix which depart individually through the jacket of the steam generator by means of sleeves.

Steam generators are also known in which the U-shaped exchange tubes have two straight branches and a curved part.

In all cases, it is necessary to provide a homogeneous distribution of the supply water in the tubes of the bundle of the steam generator, level with the water box.

In the case of steam generators including tubes in a helix configuration, it has been proposed to place flow rate-restricting members inside the outer tubes connected to the tubes of the steam generator passing through the jacket by means of sleeves..

The dismantling and replacement of these flow rate-restricting members is a long and delicate operation, and it is very difficult to adapt the characteristics of the flow rate-restricting orifice plates so as to adjust the flow rate in each of the tubes of the bundle of the steam generator to obtain stabilize the operation of the steam generator, regardless of the operating speed.

Flow rate-restricting members installed in the inlet part of the tubes of the steam generator in effect make it possible to obtain good static and dynamic stability for the operation of the steam generator. The flow rates passing through each of the tubes are balanced.

In the case of a steam generator in which it has been necessary to plug a certain number of tubes of the bundle after an incident or accident (for example, an accident having given rise to a reaction between the sodium and the water), it is proposed to place, in each of the tubes, orifice plates of adapted characteristics, so as to rebalance the flow-rates in the tubes remaining in service.

To date, no method was known for varying and to adjusting the flow rate inside a tube of a steam generator connected to a tube plate delimiting a water box in order to adapt the head loss and the flow rate of the fluid circulating in the tube, taking account of the position of the plug tubes in the bundle.

SUMMARY OF THE INVENTION

An object of the invention is therefore to provide a device for adjusting a supply water flow rate in a tube of a steam generator fixed, at one of its ends, to a tube plate, in the alignment of a penetration opening of the tube plate opening out into a water box for supplying the steam generator, this device making it possible to adapt the flow rate inside the tube to the operating conditions of the steam generator, so as to obtain stable hydraulic operating conditions.

To this end, the device includes a flow rate-restricting orifice plate whose shape and dimensions allow it to be inserted into the penetration opening of the tube plate and means for connecting the orifice plate onto the tube plate.

BRIEF DESCRIPTION OF THE DRAWINGS

In order to make the invention easy to understand, there will now be described, by way of example and with reference to the appended drawings, a flow rate-adjusting device according to two embodiments of the invention for a steam generator with straight tubes.

DESCRIPTION OF THE PREFERRED EMBODIMENT

Figure 1:
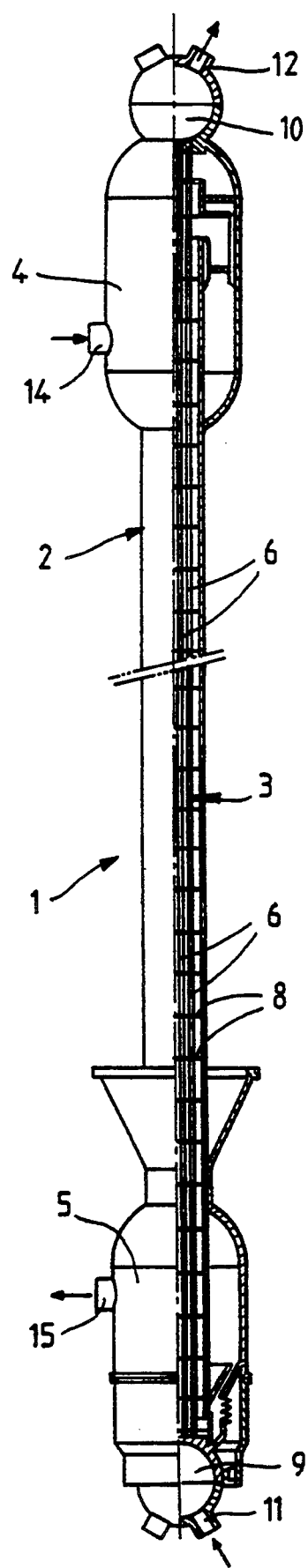
FIG. 1 is an elevation view, partly in section, of a steam generator with straight tubes of a fast neutron nuclear reactor.

FIG. 1 shows a steam generator with straight tubes and an outer jacket 2, of very great length, containing the bundle 3 of the steam generator and including an upper part 4 and a lower part 5 of widened diameter connecting onto the central part of the jacket, which is cylindrical.

The steam generator 1 has been represented in its service position in which the straight tubes 6 of the bundle 3, which are perfectly rectilinear and mutually parallel, are arranged vertically.

The tubes 6 are held in an even network in the transverse sections of the bundle by spacer-grids 8 placed horizontally.

Each one of the tubes 6 of the bundle 3 is connected at its lower end to a water box 9 of spherical shape, and, at its upper end, to a steam manifold 10, also of spherical shape, by means of tube plates including apertures allowing the tubes of the bundle to be fixed by welding.

A pipe 11 is fixed to the wall of the water box 9 level with an opening passing through its wall, to allow the connection of the water box to a supply circuit of water to be vaporized.

The supply water penetrating into the water box is distributed into the tubes 6 of the bundle 3 of the steam generator, so that each of the tubes is supplied with water with a flow rate which is substantially constant for the entire bundle.

A steam outlet pipe 12 is fixed to the wall of the steam manifold 10, level with an opening passing through the wall of the manifold.

The upper part 4 of the wall of the outer jacket 2 of the steam generator is traversed by a sodium inlet pipe 14.

The lower part 5 of the outer jacket 2 is also traversed by a sodium outlet pipe 15.

The hot sodium introduced by the pipe 14 into the jacket 2 is split up so as to flow in contact with all of the tubes of the bundle 3, in the vertical direction from top to bottom.

The supply water introduced into the water box and split up homogeneously in the tubes of the bundle comes into thermal contact, through the wall of the tubes 6, with the hot sodium flowing from top to bottom.

The supply water flows from bottom to top inside the tubes of the bundle and is vaporized progressively. The steam produced is collected by the manifold 10.

Figure 2:
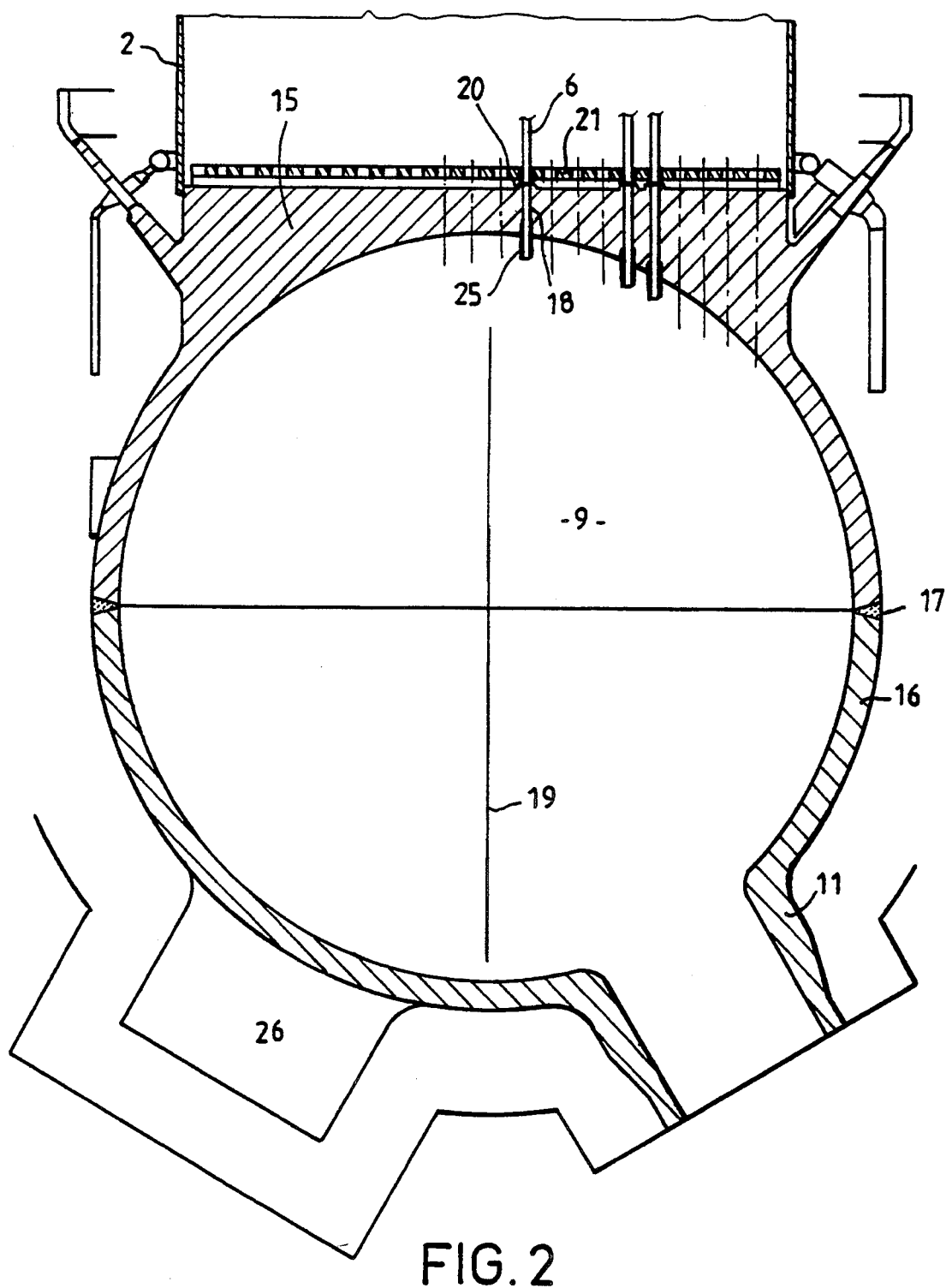
FIG. 2 is a sectional view of the water box of a steam generator equipped with orifice plates.

FIG. 2 shows the lower part of the steam generator including the water box 9 of substantially spherical shape which is delimited by a tube plate 15 and a body 16 including internal hemispherical surfaces connected by a welding bead 17.

The tube plate 15 includes an upper part delimited on the outside by a plane surface and traversed by openings 18 arranged in an even network in a plane of straight section of the tube plate perpendicular to the longitudinal axis 19 of the bundle. The tubes 6 of the bundle 3 are each fixed into the extension of an opening 18, by welding onto a nipple 20 machined on the plane upper face of the tube plate 15. A plate 21 for protecting the tube plate 15 is fixed above the plane face of the tube plate 15 so as to limit the thermal effects of the flow of hot liquid sodium flowing from top to bottom inside the jacket 2 of the steam generator on the tube plate 15, and also to limit the risks connected with the occurrence of a sodium/water reaction.

The protection plate 21 is pierced with openings allowing the passage of the tubes 6 which are fixed onto the tube plate 15, under the protection plate 21.

According to the invention, the water flow rate in each of the tubes 6 of the bundle 3 is adjusted by placing an orifice plate 25 of appropriate characteristics in the corresponding penetration opening 18 of the tube plate 15, in order to balance the flow of the fluid in the tubes 6 of the bundle, as a function of the hydraulic operation constraints on the steam generator.

In the case where the orifice plates 25 must be replaced by orifice plates of different characteristics, in all or part of the openings in the tube plate 15, this operation may be carried out, during a shutdown of the nuclear reactor, from inside the water box.

This operation may be carried out by introducing a manual or automatic tool through a manhole 26 passing through the wall of the water box.

Figure 4:
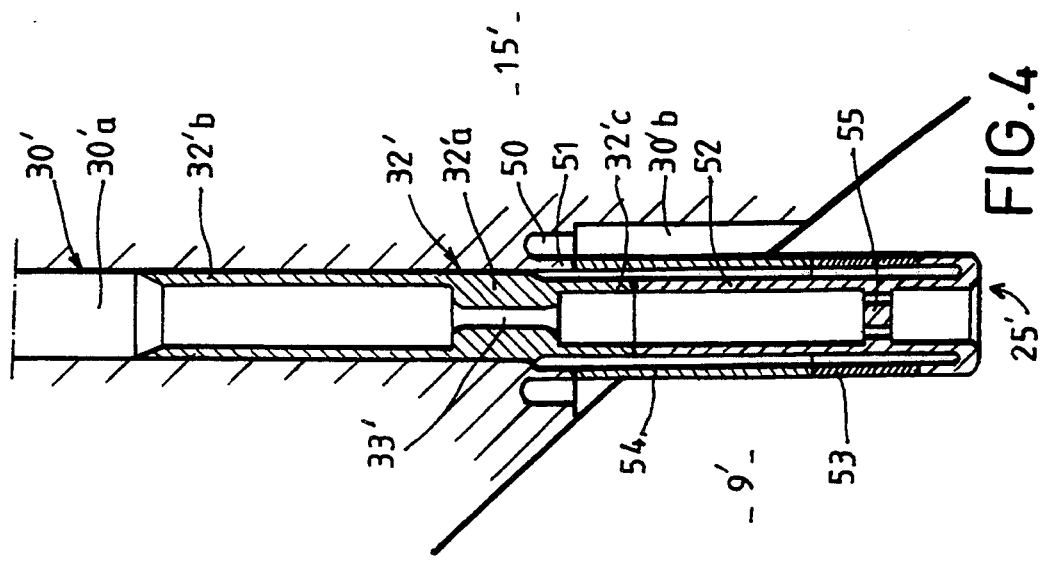
FIG. 4 is a sectional view of a variant of a flow rate-restricting orifice plate.
Figure 3A:
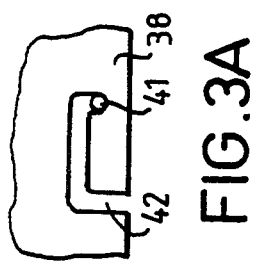
FIG. 3A is a developed and side elevation view of means for fixing the flow rate-restricting orifice plate.
Figure 3:
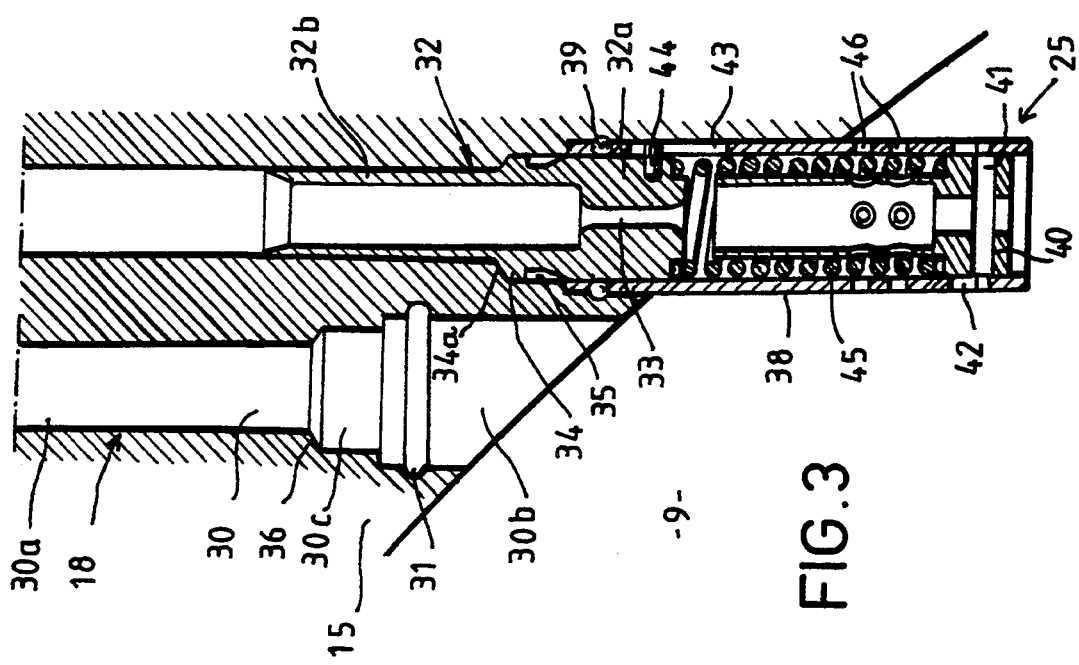
FIG. 3 is a sectional view of a part of the tube plate of the water box represented in FIG. 2, showing an opening in the tube plate and a flow rate-restricting orifice plate.

In all cases, use is made of removable or dismantleable orifice plates such as those represented in FIGS. 3 and 3A or 4.

The orifice plate represented in FIG. 3 is a removable orifice plate including mechanical means for fixing inside an opening of the tube plate.

FIG. 3 shows a part of the lower tube plate 15 delimiting the water box 9 of the steam generator represented in FIG. 2.

The tube plate 15 is pierced with openings 30 arranged in an even network and passing entirely through the plate 15, in the axial direction of the bundle of tubes.

Each of the openings 30 includes a span 30a whose diameter corresponds substantially to the internal diameter of a tube 6 of the bundle and a diametrically widened part 30b opening out into the water box 9 and separated from the span 30a by a part 30c whose diameter is intermediate between the diameter of the part 30a and the diameter of the part 30b.

In its large diameter part 30b, the internal surface of the wall is machined in order to constitute a groove 31 of toric shape whose meridian cross-section has the shape of a circular arc or of a semi-circle.

The opening 30 visible in FIG. 3 is intended to receive the active part or orifice plate of a flow rate-restricting device such as 25.

The actual orifice plate 32 includes a body 32a traversed axially by a calibrated opening 33 whose geometric and dimensional characteristics define the hydraulic characteristics of the orifice plate 32.

The body 32a is extended by a tubular skirt 32b whose outer diameter is very slightly less than the internal diameter of the span 30a of the opening 30 in which the restricting device 25 is placed.

The internal bore of the skirt 32b communicates with the outlet of the calibrated orifice 33 and includes a flared part of frustoconical shape at its end.

The skirt 32b of the orifice plate 32 provides protection of the tube plate, particularly against erosion by the water introduced by the calibrated orifice 33 and coming from the water Box 9.

The body 32a of the orifice plate 32 includes a bearing surface 34 having an external support surface 34a of spherical shape as well as a groove 35 adjacent to the bearing surface 34.

The part of the internal surface of the opening 30 located between the parts 30c and 30a of the opening constitutes a frustoconical bearing surface 36 with which the spherical support surface 34a of the orifice plate comes into contact, when the orifice plate 32 is mounted inside the opening 30.

The flow rate-restricting device 25 includes removable elements for fixing and mounting the orifice plate 32 in the opening 30.

These means include a sleeve 38, locking balls 39 engaged in openings passing through the wall of the sleeve 38 and a bayonet lock 40 including a traverse shouldered spindle 41 whose smaller diameter end may be engaged in a locking slot 42 passing through the wall of the sleeve 38, visible in FIG. 3A which represents a developed view of the wall of the sleeve 38.

In addition, the wall of the sleeve 38 is traversed by a longitudinal slot 43 in which there may be engaged a traverse peg 44 fixed to the body 32a of the orifice plate 32, so as to project with respect to the outer surface and to assemble the sleeve 38 and the orifice plate when the flow rate-restricting device 25 is being mounted.

A helical spring 45 inserted into the sleeve 38 and interposed between the bayonet lock 40 and the orifice plate 32 makes it possible to push back and hold the orifice plate 32 inside the opening 30.

In addition, the wall of the sleeve is traversed through by piercings 46 of smaller diameter having a specified cross-section serving as a reference to prevent plugging of the calibrated opening of the orifice plate 33.

The operations for installing and fixing a flow rate-restricting device 25 in an opening 30 of the tube plate 15 of the steam generator will now be described.

The sleeve 38 of the device 25 to be installed in the opening 30 equipped with locking balls 39 (six locking balls are used, arranged in holes distributed evenly at the periphery of the sleeve 38) is engaged on the body 32a of the orifice plate 32, so that the balls 39 are located level with the groove 35.

The sleeve 38, in which the orifice plate 32 is engaged, is inserted, from inside the water box, into the opening 30 so that the end of the sleeve 38 comes into abutment on the shoulder constituting the end part of the part 30b of the opening 30.

This insertion is possible, since the locking balls 39 can retract in the radial direction inside the groove 35, during the insertion of the sleeve and of the orifice plate. The sleeve 38 and the orifice plate 32 remain securely attached by virtue of the peg 44 inserted into the slot 43 on the sleeve 38.

When the sleeve 38 is in abutment against the bottom of the part 30b of the opening 30, the balls 39 are facing the groove 31.

There are inserted into the sleeve 38 the spring 45, then the locking device 40 in which the projecting end part of the spindle 41 is inserted into the mouth part of the slot 42. The lock 40 is pushed in the axial direction, so that it exerts a thrust on the spring 45 and, by means of the latter, on the orifice plate 32.

The orifice plate 32 moves inside the opening 30 until the spherical support surface 34a comes to bear on the frustoconical bearing surface 36 of the opening 30.

The displacement of the lock in the axial direction as far as its support position represented in FIG. 3 gives rise to the radial displacement of the locking balls 39 towards the outside, so that the balls penetrate into the groove 31 and produce the fixing, by locking, of the flow rate-restricting device 25 in the opening 30 of the tube plate 15.

When the support surface 34a of the orifice plate has come into abutment on the support surface 36 of the opening 30, the lock 40 is made to turn so that the end of the shouldered spindle 41 comes into a locking end of in the opening 42, as represented in FIG. 3A.

The flow rate-restricting device 25 and the orifice plate 32 are therefore held on the tube plate by a locking device with a bayonet.

The installation and locking of the lock 40 are produced by using a tool of special shape including, for example, pegs or stubs which are inserted into cavities of the lock 40.

The flow rate-restricting device 25 may be dismantled by unlocking the lock 40 which is then separated and extracted from the sleeve 38, so as to extract the spring 45 and allow the lock 32 to redescend into a position such that the groove 35 is level with the locking balls 39.

It is then possible to dismantle the device 25 simply by pulling on the sleeve, the locking balls 39 coming into the retracted position in the groove 35.

When the flow rate-restricting device 25 is in service, supply water penetrates into the bore of the sleeve via the piercings 46. If the supply water includes, these impurities progressively plug the apertures 46.

The cross-section of the apertures 46 is such that they necessarily become plugged before the calibrated orifice 33 of the orifice plate 32.

By monitoring the plugging of the apertures 46, it is therefore possible to detect the risks of the orifice plate 32 becoming plugged.

As has been explained earlier, it is possible to dismantle and to replace any orifice plate 32, from inside the water box, with an orifice plate having different hydraulic characteristics.

It is thus possible, during checking and repairing operations of the steam generators of the nuclear reactor, to modify the hydraulic behavior of these generators, as a function of the constraints imposed by their use.

FIG. 4 represents variant of a flow rate-restricting device 25' making it possible to implement the method for adjusting supply water flow rate in a steam generator tube, according to the invention.

The lower tube plate 15' of a steam generator delimiting a water box 9' is traversed by openings 30' level with each of which is fixed a tube of the bundle of the steam generator on the upper face of the tube plate 15' (not visible in FIG. 4).

The opening 30' passing through the tube plate 15' includes an upper span 30'a and a lower part 30'b with a large diameter opening out inside the water box 9'.

The tube plate 15' is machined so as to comprise a groove 50 coaxial with the opening 30', extending upwards the large-diameter part 30'b, and a connection lip 51 of small thickness and annular shape which is also coaxial with the opening 30'.

In the case of steam generators of fast neutron nuclear reactors, the tube plate 15' is made from ferritic steel with 9% chromium.

The flow rate-restricting device 25' includes an orifice plate 32' constituting the actual flow rate-restricting member, a tubular element 52 for filtration and connection, and two connection sleeves 53 and 54 arranged end-to-end and allowing the element 52 to be connected by welding and the orifice plate 32' to be fixed into the opening 30' of the tube plate 15'.

The orifice plate 32' includes a body 32'a traversed by a calibrated orifice 33' whose geometric and dimensional characteristics define the hydraulic characteristics of the orifice plate and a skirt 32'b providing protection for the inlet part of the opening 30' of the tube plate 15'.

The body 32'a of the orifice plate is extended by a tubular spool piece 32'c.

The orifice plate 32' and the filtering and connecting element 52 are made of chromium/nickel stainless steel which cannot be directly welded using the TIG method (welding with a tungsten electrode under an inert gas), onto the ferritic steel with chromium constituting the tube plate 15'.

The element 52 and the orifice plate 32' are connected to the tube plate by means of two sleeves 53 and 54 in a manner to be described hereinbelow.

The sleeve 53 is made of chromium/nickel stainless steel and the sleeve 54 is made of ferritic steel with 9% chromium.

In order to weld the orifice plate and of the connecting and filtering element 52 to the tube plate which is made of ferritic steel with chromium, the sleeves 53 and 54 are first connected by heterogenous butt-welding by producing a slight excess thickness of the two butt-welded components. The excess thickness of the laser weld is reworked and this weld is checked.

The butt-welding of the sleeves 53 and 54 has made it possible to obtain a heterogenous spool piece which is used for fixing the flow rate-restricting device 25'.

The spool piece is fixed onto the tube plate 15' by butt-welding the end of the sleeve 54 onto the annular tab 51 machined in the tube plate 15'.

The welding operation is carried out level with all the openings 30' located in the extension of a tube of the bundle level with which it is desired to position or replace a flow rate-restricting device.

In a second phase, the filtering and connecting element 52 are butt-welded onto the tubular part 32'c of the orifice plate 32 using the TIG method. The weld produced is checked.

The orifice plate 32' is inserted into the opening 30' for which it is intended and the end of the filtering and connecting element 52 is fixed by TIG welding onto the end of the stainless steel sleeve 53. The weld is checked.

The same operation is produced for all the flow rate-restricting devices such as 25' which are to be mounted inside an opening 30' of the tube plate 15' of the steam generator.

The fixing thus produced gives high metallurgical quality and very good sealing.

However, compared with the orifice plate fixed by mechanical means represented in FIGS. 3 and 3A, the welded orifice plate represented in FIG. 4 has the drawback of being less easy to replace.

It is, in fact, necessary to cut out and to remachine the spool piece of the device, before replacing it with a device including an orifice plate 32' of different characteristics.

The internal bore of filtering element 52 includes a filtering mesh 55 including a plurality of calibrated through-holes making it possible to trap impurities and prevent the plugging of the calibrated orifice 33' of the orifice plate 32'.

The replacement operations may be carried out from inside the water box, under the tube plate 15', possibly after dismantling the hemispherical body of the water box.

In all cases, the device according to the invention makes it possible to adapt the flow of the supply water in the tubes of the steam generator to the hydraulic operating conditions of the steam generator.

The installation of flow rate-restricting members 25 or 25' each including an orifice plate of specified hydraulic characteristics makes it possible to balance the flow rates between the various tubes of the bundle of the steam generator, in particular in the case where some defective tubes have been plugged. which have been described. Thus, the shape of the orifice plates may differ from the one which has been described, and the fixing means may differ from those described; e.g., they may be of a mechanical type or call for welding.

The invention applies not only to steam generators with straight tubes of fast neutron nuclear reactors cooled by a liquid metal such as sodium, but also to the steam generators of these nuclear reactors having tubes with a helical or other shape, and more generally to the steam generators of any nuclear reactor including a bundle of tubes fixed at one of their ends into a tube plate delimiting a water box. In particular, the method and the device according to the invention may be used in the case of steam generators of nuclear reactors which are cooled by pressurized water, including tubes bent into a U shape.

We claim:

1. In a steam generator comprising a tube plate, a plurality of openings passing through the tube plate and opening out into a water-box for supplying the steam generator, and a plurality of tubes each having an end fixed to a face of the tube plate in alignment with a said through opening, the improvement comprising a device for adjusting a supply water flow rate in at least one tube including a flow rate restricting orifice plate inserted into a said through opening of said tube plate and means for fixing said orifice plate into said tube plate.

2. Device according to claim 1, wherein said orifice plate includes a body of overall cylindrical shape traversed axially by a calibrated orifice and a tubular skirt extending said body whose outer diameter is less than a diameter of said through opening of said tube plate having an internal bore communicating with said calibrated orifice.

3. Device according to claim 1 or 2, wherein said orifice plate includes a support surface on a corresponding bearing surface of a penetration opening of said tube plate and mechanical means for fixing said orifice plate onto said tube plate, and for pushing on said orifice plate so as to bring said support surface and a corresponding surface of said opening into sealed contact.

4. Device according to claim 3, wherein said mechanical means for fixing said orifice plate onto said tube plate include a sleeve having a side wall comprising at least two through openings each enclosing a locking ball, a groove projecting radially outwards with respect to an internal surface of said opening, a groove projecting towards an inside in said body of said orifice plate, a bayonet lock mounted inside said sleeve, a helical spring and means for linking said sleeve and said orifice plate whose body is inserted into said sleeve via an end of said sleeve which is opposite said lock, said helical spring being interposed between said lock and said orifice plate.

5. Device according to claim 4, wherein said sleeve includes calibrated apertures passing through said guide wall of said sleeve.

6. Device according to claim 1 or 2, wherein said means for fixing said orifice plate onto said tube plate include successive elements for connecting said orifice plate onto said tube plate by butt-welding.

7. Device according to claim 6, wherein said orifice plate is made of stainless steel and the tubular successive connection elements for said orifice plate include a first tubular element made of stainless steel, a second tubular element made of stainless steel and a third tubular connection element made of ferritic steel with 9% chromium, said second and third tubular elements previously butt-welded together constituting a heterogenous spool piece between an annular connection tab of said tube plate and a connection end of said first tubular element welded onto a tubular end part of said orifice plate.

8. Device according to claim 7, wherein said tubular connection element includes a filtering element having an internal bore traversed by calibrated openings.

* * * * *